United States Patent [19]

Rheinfelder

[11] Patent Number: 4,643,000
[45] Date of Patent: Feb. 17, 1987

[54] ABSORPTION-RESORPTION HEAT PUMP

[75] Inventor: Juan B. Rheinfelder, Kerkrade, Netherlands

[73] Assignee: Rendamax A.G., Zug, Switzerland

[21] Appl. No.: 797,797

[22] Filed: Nov. 14, 1985

[30] Foreign Application Priority Data

Nov. 19, 1984 [NL] Netherlands .................... 8403517

[51] Int. Cl.$^4$ ................................................ F25B 17/00
[52] U.S. Cl. .......................................... 62/467; 62/48; 62/476; 62/514 R
[58] Field of Search ............... 62/467, 514 R, 48, 476; 165/104.12

[56] References Cited

U.S. PATENT DOCUMENTS

| 4,111,002 | 9/1978 | Van Mal et al. | 62/467 |
| 4,402,795 | 9/1983 | Erickson | 62/476 |
| 4,464,907 | 8/1984 | Mack et al. | 62/476 |
| 4,519,441 | 5/1985 | Spevack | 62/476 |

FOREIGN PATENT DOCUMENTS

| 0054719 | 6/1982 | European Pat. Off. |
| 0056147 | 7/1982 | European Pat. Off. |
| 278076 | 9/1914 | Fed. Rep. of Germany. |
| 678942 | 6/1939 | Fed. Rep. of Germany. |
| 3018739 | 11/1981 | Fed. Rep. of Germany. |
| 1301693 | 7/1962 | France. |
| 2445939 | 1/1980 | France. |
| 2002505 | 2/1979 | United Kingdom. |

Primary Examiner—Ronald C. Capossela
Attorney, Agent, or Firm—Browdy and Neimark

[57] ABSTRACT

An absorption-resorption heat pump comprising a first circuit including a desorber and an absorber interconnected by conduits having a heat exchanger provided therein, so that a first circulatory flow of a first system of liquid substances can be maintained by suitable means from the desorber to the absorber via one of the conduits and from the absorber to the desorber via another one of the conduits, and a second circuit including a resorber or condenser and an evaporator likewise interconnected by conduits having a heat exchanger provided therein, so that a second circulatory flow of a second system of essentially similar liquid substances can be maintained by suitable means from the evaporator to the resorber or condenser via one of the conduits and from the resorber or condenser to the evaporator via another one of the conduits. The desorber of the first circuit is connected through a conduit for a volatile component of the first system of substances to the resorber or condenser of the second circuit and the evaporator of the second circuit is connected through a conduit for a volatile component of the second system of substances to the absorber of the first circuit. A branch circuit extends from a point in the second circuit to the desorber section of the first circuit.

10 Claims, 1 Drawing Figure

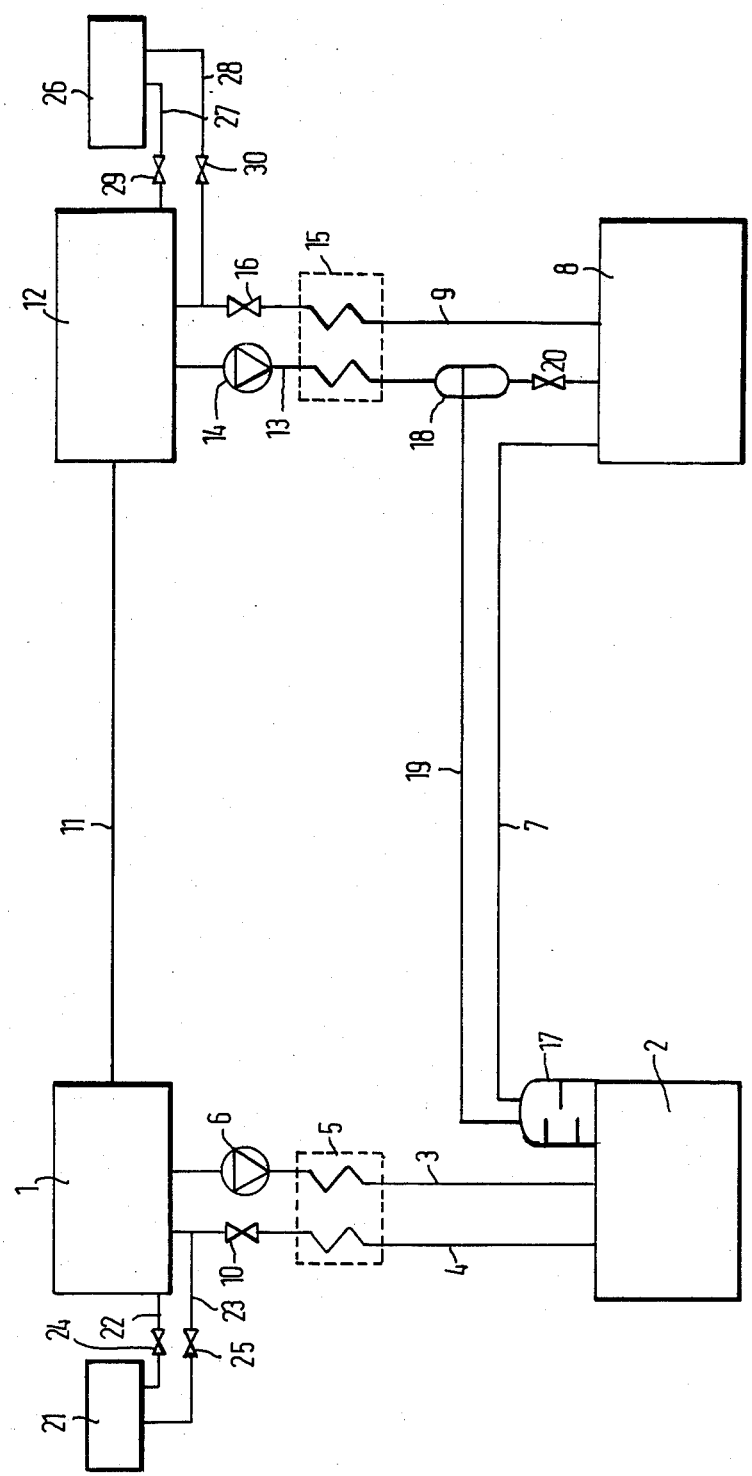

ABSORPTION-RESORPTION HEAT PUMP

The invention relates to an absorption-resorption heat pump comprising a first circuit including a desorber and an absorber interconnected by conduits having a heat exchanger provided therein, so that a first circulatory flow of a first system of liquid substances can be maintained by suitable means from the desorber to the absorber via one of the conduits and from the absorber to the desorber via another one of these conduits, and a second circuit including a resorber or condenser and an evaporator likewise interconnected by conduits having a heat exchanger provided therein, so that a second circulatory flow of a second system of essentially similar liquid substances can be maintained by suitable means from the evaporator to the resorber or condenser to the evaporator via another one of these conduits, the desorber of the first circuit being connected through a conduit for a volatile component of the first system of substances to the resorber or condensor of the second circuit and the evaporator of the second circuit being connected through a conduit for a volatile component of the second system of substances to the absorber of the first circuit, and a branch conduit extending from a point in the second circuit to the desorber section of the first circuit.

Such a heat pump is known from European patent application No. 0,054,719. Essential for such an absorption-desorption heat pump is the presence of two circulatory circuits through which suitable systems of substances circulates. Suitable systems are, inter alia, a mixture of lithium bromide and water, a mixture of 50% of lithium bromide and 50% of zinc chloride and water, and a mixture of ammonia ($NH_3$) and water. The two circulatory circuits in the heat pump are separated from each other in principle in the liquid phase and are connected with each other in the vapour phase. During operation of the heat pump, the concentrations of the components in the circulatory flows will differ from each other.

In the first circulatory flow, to which usually primary energy is added (for example, by means of a burner under the desorber), the volatile component of the system of substances has the lowest concentrations. In the desorber, the primary energy is applied to the circulatory flow, which may be called the poor flow in view of the low concentration of volatile component therein as compared with the average concentration, as a result of which this poor flow is further depleted by the expulsion of the volatile component in the vapour phase. The gas flow of thus-expelled volatile component is passed to the resorber in the second circulatory circuit, in which resorber a slightly lower pressure is maintained. There the volatile component is absorbed into the second circulatory flow, which may be called the rich flow in view of the concentration of volatile component therein. The rich flow is thus further enriched, while the absorption results in the evolution of heat, which heat may be used for some purpose.

The enriched rich flow is passed from the resorber to the evaporator. Upstream of this evaporator, the flow is caused to expand so that it flashes spontaneously. By flashing is understood the creation of a vapour phase, the heat required for which is withdrawn from the latent heat of the circulatory flow. A vapour phase is produced in the evaporator, while the rich flow is depleted and cools down. The rich flow is even further depleted by the application of secondary energy, such as geothermal heat, heat from the atmosphere or from industrial waste water, or solar energy. The low pressure vapour phase is passed from the evaporator to the absorber in the first circulatory circuit and is there absorbed into a depleted poor circulatory flow with the evolution of heat, which heat may be used for some purpose. The depleted poor first circulatory flow itself is passed from the desorber to the absorber while undergoing a pressure drop. As a small amount of volatile component is present, this will usually not be attended by flashing.

Each one of the circulatory circuits includes a heat exchanger in which the latent heat of the outgoing flow is transferred to the incoming flow in the same circulatory circuit.

As the concentrations in the two circuits are not stable, inter alia as at different temperatures and pressures different concentrations yield optimum results, the prior art device is provided with a branch conduit connecting to a control valve included in the conduit between the evaporator and the resorber, which branch conduit opens into a rectifying column connected to the desorber. The control valve in the prior art device is operated in dependence upon the pressure in the resorber and hence in dependence upon the temperature there. The realization of such operation requires a considerable amount of control equipment.

It is an object of the invention to enhance the prior art device and provide a simpler one by means of which the same results can be obtained without a large amount of control equipment being required.

This object is achieved by means of a device in which a storage vessel is provided at a point downstream of the heat exchanger in that section of the second circuit where liquid passes from the evaporator to the resorber, which storage vessel includes an overflow mechanism, and the branch conduit is connected to this overflow mechanism. By using a simple overflow mechanism in accordance with the invention, there is no need for the large amount of control equipment required in the prior art device, while a similar and, in terms of thermodynamics, optimum result is obtained.

The storage vessel of the device according to the invention may conveniently be part of or be fitted within the resorber.

As stated earlier, in devices of the subject kind it should be possible for the concentrations of the solutions in both circuits to vary in order to allow an optimum heat ratio to be obtained under varying circumstances. One possibility for achieving such variability of the concentrations is to so dimension all containers of the device that the level of the solution can vary. As the vapour formed in the desorber has a lower concentration of active substance than the vapour formed in the evaporator, an interruption in the flow from the resorption section back to the absorption section results in an increase in the level of the solution in the resorber and the evaporator and an increase in the concentration in the circulatory circuit of the desorber and the absorber, while the concentration in the circuit of the resorber and the evaporator decreases. When there is sufficient flow-back, the concentrations vary in opposite sense. To allow the concentrations to vary to a considerable extent, however, the volume of the various containers of the device should be so large that relatively large variations in the amount of liquid in each container can be realized. The bringing about of the desired variations requires the making of level measurements. The control mechanisms needed therefor complicate the device.

In a preferred embodiment of the device according to the invention, it is possible to realize variations in the concentrations throughout a wide range without altering the levels in the different containers as the two circuits are provided with containers in which part of the liquid circulating in the respective circuit can be stored, so that this part is temporarily kept from circulating. Such an embodiment permits a control with simple level switches or overflow mechanisms.

In this preferred embodiment, one of the containers is adapted to store liquid rich in active material while the other container is adapted to store liquid poor in active material. To this end, the containers are so mounted that one is connected with the conduit for the liquid of higher active component concentration and the other is connected with the conduit for the liquid of lower active component concentration. Accordingly, one of the containers can be conveniently connected to either the evaporator or the resorber or the conduit through which the liquid passes from the resorber to the evaporator, and the other container can be connected to either the absorber or the desorber or the conduit through which the liquid passes from the desorber to the absorber. Such an arrangement permits the concentrations of the circulating liquids to be varied as either a greater amount of liquid can be stored in one container or a greater amount of liquid can be stored in the other, so that the amount of liquid circulating remains constant even when the concentrations vary.

The containers may be connected parallel to the absorber and the evaporator, respectively. Then the inlet conduits of the containers are connected to the conduit passing liquid from the desorber to the absorber and the conduit passing liquid from the resorber to the evaporator, respectively, and the outlet conduits of the containers are connected to the outlet of the absorber and the outlet of the evaporator, respectively.

The invention will now be described in greater detail with reference to the single FIGURE showing a schematic representation of an embodiment of the heat pump according to the invention.

In the FIGURE, the various components of the device according to the invention are chiefly shown as blocks. The components are interconnected by conduits shown as full lines.

The device comprises a first circulatory circuit including an absorber 1 and a desorber 2. Absorber 1 and desorber 2 are interconnected by a pair of conduits 3 and 4. Conduits 3 and 4 extend through a heat exchanger 5 in which the liquid passing through conduit 3 can give up heat to the liquid passing through conduit 4. Conduit 3 has a pump 6 therein for causing a liquid to circulate through the first circuit, which liquid usually consists of a mixture of an essentially liquid substance with a more volatile component. The mixture of substances passes through conduit 3 to enter desorber 2. Energy is being applied to desorber 2, for example by means of a gas burner. As a result, a large portion of the volatile component escapes from the mixture. This relatively high pressure gaseous component is passed through a conduit 7 to a resorber 8 included in a second circulatory circuit. In resorber 8 the volatile component is resorbed into the flow passing through this resorber, which flow consists of a similar mixture of substances as that flowing in the first circulatory circuit but is already relatively rich in that volatile component. As a result, a rich flow is passed out from resorber 8 through conduit 9, which flow is processed in a manner to be described later on.

The circulatory flow heated in desorber 2 is passed via conduit 4 through heat exchanger 5, where heat is given up to the flow in conduit 3, to reach absorber 1 via a release valve 10. By means of release valve 10 a substantial pressure drop is realized, so that the pressure in absorber 1 is far lower than that in desorber 2. In absorber 1 absorption of volatile component into the liquid phase takes place, so that the liquid flow from absorber 1 through conduit 3 is richer than the flow passing through conduit 4 to absorber 1. Besides volatile component from release valve 10, volatile component passed from an evaporator 12 through a conduit 11 to absorber 1 is absorbed there into the liquid phase. The absorption heat evolved in absorber 1 is discharged for use for some purpose.

The second circulatory circuit of the device according to the invention includes resorber 8 and evaporator 12, which are interconnected by conduits 9 and 13. A rich liquid flow is passed by the pump 14 via the heat exchanger 15 to resorber 8, where this flow is further enriched by the inclusion therein of volatile component passed to resorber 8 through conduit 7. The evolving heat is discharged from resorber 8 for use for some purpose. The enriched flow is passed from resorber 8 through conduit 9 via the heat exchanger 15 to the release valve 16. In heat exchanger 15 the flow through conduit 9 can give up heat to the flow through conduit 13. In release valve 16 a release of pressure of the enriched liquid flow takes place, causing the mixture to flash. The pressure in evaporator 12 is therefore relatively low. By applying secondary energy to the already slightly depleted liquid in evaporator 12, still more volatile component volatizes. As stated above, the volatile component is passed through conduit 11 to absorber 1.

Due to the relatively low pressure in evaporator 12, even at low temperatures still more volatile component can be expelled from the liquid flow. Therefore, a source that is normally not suitable for heating purposes may be used as a source of secondary energy. Examples of such secondary energy are geothermal energy, heat from the atmosphere, heat from industrial waste water and solar energy. In the device according to the invention this secondary energy is boosted to a useful level in resorber 8 and absorber 1, respectively.

Conduit 7 passing the liquid phase from desorber 2 to resorber 8 may have its end facing desorber 2 connected either directly to this desorber or to a rectifying column 17 coupled with desorber 2.

In accordance with the invention, the circuit of resorber 8 and evaporator 12 includes a storage vessel 18 having an overflow mechanism. As shown in the FIGURE, storage vessel 18 is located in conduit 13 at a point downstream of heat exchanger 15, or this vessel is part of resorber 8 or is fitted therein. A branch conduit 19 extends from storage vessel 18 to desorber 2. As shown, this conduit 19 may be connected to rectifying column 17. The extent of the enrichment and depletion of the liquid flows in the two circuits, i.e., the concentrations of the volatile component in the liquid flows, can be controlled by means of storage vessel 18, branch conduit 19 and a valve 20 without complex control equipment being required.

In accordance with the invention, the two circulatory circuits are further provided with containers in which part of the liquid circulating in the respective circuit can be stored. For example, in the first circuit the container 21 is connected through the conduit 22 to absorber 1 and through the conduit 23 to the conduit passing liquid from desorber 2 to absorber 1. Control valves 24 and 25 are included in conduits 22 and 23, respectively, for permitting a control of the storage in container 21. In the second circuit, for example the container 26 is connected through the conduit 27 to evaporator 12 and through the conduit 28 to the conduit passing liquid from resorber 8 to evaporator 12. Control valves 29 and 30 are included in conduits 27 and 28, respectively, for permitting a control of the storage in container 26. By means of containers 21 and 26 it is possible to effect changes in the concentrations of the different liquid flows in a simple way.

In illustration of the operation of the device according to the invention, the use therein of a mixture consisting of ammonia and water will now be discussed. Such a mixture is, for example, heated in desorber 2 by means of a natural gas burner. $NH_3$ gas will escape from the liquid having a temperature of approximately 130° C. The pressure in desorber 2 is then approximately 5 atmospheres. A mixture of water with only 10% of $NH_3$ is passed out through conduit 4. This mixture is enriched in absorber 1 at 1 atmosphere. The temperature there is approximately 45° C., suitable for use in a central heating system. The enriched mixture (water with 20% of $NH_3$) is passed to desorber 2. In the second circulatory circuit $NH_3$ gas is absorbed by the liquid flow in resorber 8. The pressure is 5 atmospheres and the temperature is 45° C., suitable for use in a central heating system. The rich mixture (water with 55% of $NH_3$) is passed to evaporator 12. Due to the expansion, the pressure there has dropped to only 1 atmosphere. The temperature of the mixture has dropped to approximately 0° C. At the temperature a reasonable amount of $NH_3$ can yet be expelled from the mixture by the application of secondary energy thereto. Ultimately a flow of water with approximately 45% of $NH_3$ passes out of evaporator 12 to resorber 8.

I claim:

1. In an absorbtion-resorption heat pump, comprising:
   (a) a first circulatory flow circuit, for a first system of liquid substances, including volatile components, having:
       (1) a desorber for separating volatile components from said first system of liquid substances,
       (2) an absorber,
       (3) a first heat exchanger,
       (4) first conduit means extending between said desorber and said absorber through said first heat exchanger, and
       (5) means for maintaining a flow of said first system of liquid substances through said first conduit means from said desorber to said absorber and from said absorber to said desorber;
   (b) a second circulatory flow circuit, for a second system of liquid substances, including volatile components, having
       (1) a resorber,
       (2) an evaporator for separating volatile components from said second system of liquid substances,
       (3) a second heat exchanger,
       (4) second conduit means extending between said resorber and said evaporator through said second heat exchanger, and
       (5) means for maintaining a flow of said second system of liquid substances through said second conduit means from said resorber to said evaporator and from said evaporator to said resorber;
   (c) means for conducting the separated volatile components from the desorber of said first circulatory flow circuit to said resorber of said second circulatory flow circuit;
   (d) means for conducting the separated volatile components from the evaporator of said second circulatory flow circuit to said absorber of said first circulatory flow circuit; and
   (e) a branch circuit extending from said second circulatory flow circuit to said desorber of said first circulatory flow circuit,
   the improvement comprising:
   a storage vessel in said second conduit means disposed between said second heat exchanger and said resorber;
   an overflow mechanism in said storage vessel; and
   means for communicating said overflow mechanism with said branch circuit.

2. The improvement according to claim 1, wherein said storage vessel is part of the resorber.

3. The improvement according to claim 2, wherein said first and second circulatory flow circuits are each provided with containers in which part of the liquid circulating in the respective circuit can be stored, so that said part is temporarily kept from circulating.

4. The improvement according to claim 1, wherein said first and second circulatory flow circuits are each provided with containers in which part of the liquid circulating in the respective circuit can be stored, so that said part is temporarily kept from circulating.

5. The improvement according to claim 4, wherein one of said containers is connected to the evaporator, the resorber or the second conduit means through which the liquid passes from the resorber to the evaporator, and the other of said containers is connected to the absorber, the desorber or the first conduit means through which the liquid passes from the desorber to the absorber.

6. The improvement according to claim 4, and further including
means for keeping the total amount of liquid stored in said containers essentially constant.

7. The improvement according to claim 5, wherein said containers are structually integrated into at least one of the evaporator, the absorber, the resorber and the desorber.

8. The improvement according to claim 5, and further including
means for keeping the total amount of liquid stored on said containers essentially constant.

9. The improvement according to claim 4, wherein said containers are structually integrated into at least one of the evaporator, the absorber, the resorber and the desorber.

10. The improvement according to claim 9, and further including
means for keeping the total amount of liquid stored in said containers essentially constant.

* * * * *